(12) United States Patent
Kapitskaia et al.

(10) Patent No.: US 7,523,091 B2
(45) Date of Patent: Apr. 21, 2009

(54) METHOD FOR USING QUERY TEMPLATES IN DIRECTORY CACHES

(75) Inventors: Olga Kapitskaia, Paris (FR); Raymond Ng, Vancouver (CA); Divesh Srivastava, Summit, NJ (US)

(73) Assignee: AT&T Corp

( * ) Notice: Subject to any disclaimer, the term of this patent is extended or adjusted under 35 U.S.C. 154(b) by 501 days.

(21) Appl. No.: 11/108,940

(22) Filed: Apr. 19, 2005

(Under 37 CFR 1.47)

(65) Prior Publication Data

US 2005/0203897 A1 Sep. 15, 2005

Related U.S. Application Data

(63) Continuation of application No. 09/841,834, filed on Apr. 25, 2001, now Pat. No. 6,904,433.

(60) Provisional application No. 60/199,541, filed on Apr. 25, 2000.

(51) Int. Cl.
*G06F 17/30* (2006.01)

(52) U.S. Cl. .............. 707/2; 707/204; 707/10
(58) Field of Classification Search .......... 707/3, 707/10, 104.1, 204
See application file for complete search history.

(56) References Cited

U.S. PATENT DOCUMENTS

| | | | | |
|---|---|---|---|---|
| 5,907,837 | A * | 5/1999 | Ferrel et al. | 707/3 |
| 6,208,986 | B1 * | 3/2001 | Schneck et al. | 707/3 |
| 6,260,039 | B1 * | 7/2001 | Schneck et al. | 707/10 |
| 6,553,368 | B2 * | 4/2003 | Martin et al. | 707/3 |
| 6,629,132 | B1 * | 9/2003 | Ganguly et al. | 709/213 |
| 6,675,261 | B2 * | 1/2004 | Shandony | 711/121 |
| 6,816,871 | B2 * | 11/2004 | Lee | 707/104.1 |
| 6,980,985 | B1 * | 12/2005 | Amer-Yahia et al. | 707/4 |
| 7,035,846 | B2 * | 4/2006 | Gupta et al. | 707/3 |
| 7,174,326 | B2 * | 2/2007 | Ireland et al. | 707/2 |
| 7,191,170 | B2 * | 3/2007 | Ganguly et al. | 707/2 |
| 7,213,249 | B2 * | 5/2007 | Loo et al. | 719/330 |

* cited by examiner

*Primary Examiner*—Jean M Corrielus

(57) ABSTRACT

The present invention discloses the use of generalized queries, referred to as query templates, obtained by generalizing individual user queries, as the semantic basis for low overhead, high benefit directory caches for handling declarative queries. Caching effectiveness can be improved by maintaining a set of generalizations of queries and admitting such generalizations into the cache when their estimated benefits are sufficiently high. In a preferred embodiment of the invention, the admission of query templates into the cache can be done in what is referred to by the inventors as a "revolutionary" fashion—followed by stable periods where cache admission and replacement can be done incrementally in an evolutionary fashion. The present invention can lead to considerably higher hit rates and lower server-side execution and communication costs than conventional caching of directory queries—while keeping the clientside computational overheads comparable to query caching.

2 Claims, 4 Drawing Sheets

```
ChooseCandidates(q,CT) {
  /* CT = {ct_1,...,ct_n} */
  NT = ∅
  for each ct_i in CT
     nt_i = CompPairTemplates(ct_i,q)
     if (nt_i = ct_i)
        /*q: specialization of ct_i*/
        b(ct_i) = b(ct_i) + c(q)
     else if (nt_i ∈ NT)
        /* nt_i: template exists */
        b(nt_i) = max(b(nt_i),
                   b(ct_i) + c(q))
     else if (s(nt_i) < S)
        b(nt_i) = b(ct_i) + c(q)
        add nt_i to NT
  age each untouched ct_i
  NT = NT ∪ CT
  if (q ∉ NT and s(q) < S)
     b(q) = c(q)
     NT = NT ∪ q
  CT = {template with highest
        benefit in NT}
  choose (n - 1) additional
     templates with largest
     values of profit p(t) in NT
  return CT
}
```

FIG. 3

```
Revolution(AT,CT) {
  /* compute CT' ⊆ AT ∪ CT */
  /* for admission */
  sort the t_i's using
     p(t_i) = (b(t_i) - c(t_i)) / s(t_i)
  CT' = ∅
  repeat
     add the highest ranked
        remaining t_i that can
        fit in the available
        cache space to CT'
     adjust free space to
        reflect s(t_i)
     adjust benefits, costs,
        sizes of unselected
        templates in CT ∪ AT
     resort
  until (no more templates
        can be added)
  CT'' = template t in CT ∪ AT
     with highest value of
     b(t) - c(t)
  if (b(CT'') ≥ b(CT'))
     return CT''
  else return CT'
}
```

FIG. 5

METHOD FOR USING QUERY TEMPLATES IN DIRECTORY CACHES

CROSS REFERENCE TO RELATED APPLICATIONS

This is a continuation of U.S. patent application Ser. No. 09/841,834, filed Apr. 25, 2001 now U.S. Pat. No. 6,904,433.

This application claims priority to U.S. Provisional Application "Evolution and Revolutions in LDAP Directory Caches,"Ser. No. 60/199,541, filed Apr. 25, 2000, the contents of which are incorporated by reference herein.

FIELD OF THE INVENTION

The present invention relates generally to network directories. More particularly, the present invention relates to the management of network directory caches.

BACKGROUND OF THE INVENTION

Various directory systems have been used in the prior art to organize electronically-stored information in a communications network and to facilitate subsequent retrieval by a user. Hierarchically structured directories, such as X.500, have recently proliferated with the growth of the Internet, and are being used to store not only address books and contact information for people but also a range of other types of information—such as personal profiles, network resource information, and network and service policies. These directory systems provide a means for managing scale arid heterogeneity, while allowing for conceptual unity and autonomy across multiple directory servers in the network, in a way far superior to what conventional relational or object-oriented databases offer. For example, network directory services based on the Lightweight Directory Access Protocol (LDAP) have proven quite popular recently. See "Lightweight Directory Access Protocol," RFC 1777, Network Working Group, IETF 1994; "Lightweight Directory Access Protocol (v3)," RFC 2251, Network Working Group, IETF 1997.LDAP is a "lighter" version of X.500's Directory Access Protocol and, like X.500, organizes directory entries into a hierarchical namespace that can be accessed by a distinguished name or by using declarative (i.e. database-style) queries. The LDAP model enables highly distributed management of entries across directory servers in the network, while still permitting a conceptually unified view of the data.

To achieve fast performance and high availability to systems on a network, it is desirable to cache information close to the client applications that access the server information. Caching is used extensively on the Internet today, e.g. in proxy servers and client browsers, to reduce user-perceived latency and improve overall network performance. Co-pending, commonly-assigned utility application, "METHOD AND APPARATUS FOR OPTIMIZING QUERIES ON NETWORK DIRECTORY CACHES," Ser. No. 09/448,811, filed on Nov. 24, 1999, (Received Notice of Abandonment dated Feb. 4, 2003 which is incorporated by reference herein, disclosed that cached directory entries can be reused in answering certain declarative queries. The use of semantic information in the client cache—although shown to be advantageous for efficient handling of declarative queries—also imposes a very high cost when individual user queries select just one or a few directory entries, as is often the case in many real LDAP applications. The storage overhead of maintaining the meta data that semantically describe the directory entries in the client cache becomes comparable to the size of the cached data, and the computational overhead of searching the meta data to determine if a user query can be answered from the cache becomes prohibitive.

SUMMARY OF THE INVENTION

The present invention discloses the use of generalized queries, referred to as query templates, obtained by generalizing individual user queries, as the semantic basis for low overhead, high benefit directory caches for handling declarative queries. Caching effectiveness can be improved by maintaining a set of generalizations of queries and admitting such generalizations into the cache when their estimated benefits are sufficiently high. In a preferred embodiment of the invention, the admission of query templates into the cache can be done in what is referred to by the inventors as a "revolutionary" fashion—followed by stable periods where cache admission and replacement can be done incrementally in an evolutionary fashion.

The present invention can lead to considerably higher hit rates and lower server-side execution and communication costs than conventional caching of directory queries—while keeping the clientside computational overheads comparable to query caching. These and other advantages of the invention will be apparent to those of ordinary skill in the art by reference to the following detailed description and the accompanying drawings.

BRIEF DESCRIPTION OF THE DRAWINGS

FIG. 3 sets forth, in pseudo-code, a process for choosing candidate templates.

FIG. 5 sets forth, in pseudo-code, a process for selecting a subset of the candidate templates for admission into the cache.

DETAILED DESCRIPTION OF THE INVENTION

Figure 1:
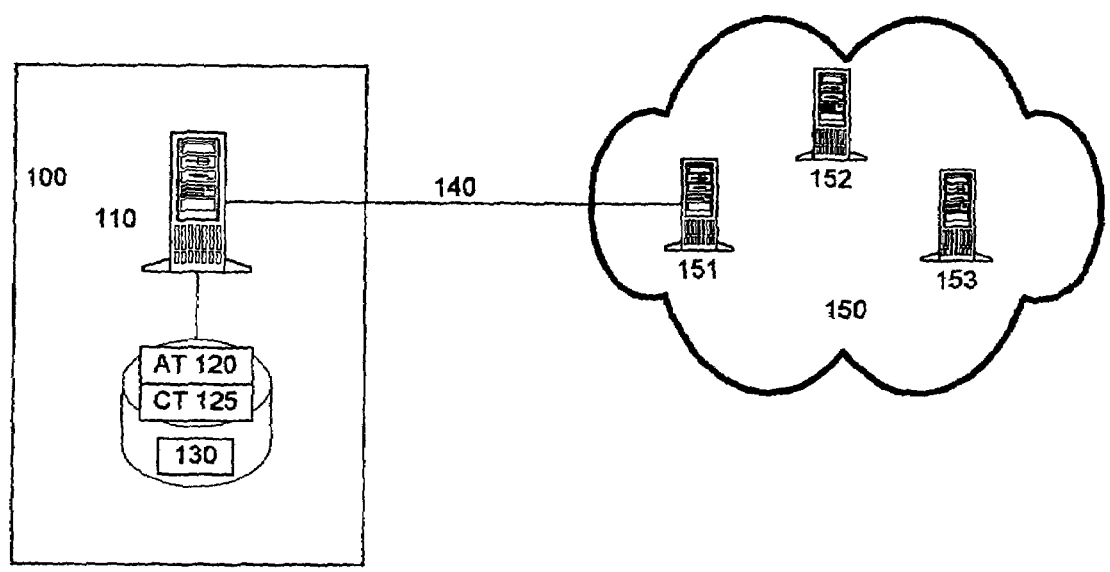
FIG. 1 sets forth a diagram of a network directory client and server illustrating an embodiment of the present invention.

FIG. 1 sets forth a diagram of a client 100 interacting with a network directory server 151 illustrating a preferred embodiment of the present invention. Network directory server 151 is one of a plurality of network directory servers 151 . . . 153 in network 150. The client's query processor 110, in response to user requests, issues network directory queries and receives query responses in the form of directory entries via communication link 140 with the network directory server 151. The client 100 has a directory cache, which stores the received directory entries in 130. A semantic description of the cached directory entries 130 is also stored at 120, as further described herein. The exact mechanism utilized to create and store the information, as well as the particular directory protocol, is not pertinent to the present invention. The set of cached directory entries 130 along with the semantic description of the cached data 120 is referred to as the "semantic" network directory cache. The data stored in the cache is a subset of the data available at the directory servers 151, . . . , 153.

In accordance with an aspect of the invention, a generalization of the user network directory queries, referred to by the inventors as a "query template," is utilized in the semantic description 120 of the cached directory entries 130. The definition of a query template can be formally represented as follows: consider a directory schema S, and a set of conjunctive network directory queries Q={$q_1, \ldots, q_n$}. A network directory query can be considered to have a filter $f_q$ that is a boolean combination of atomic filters on the schema attributes of the network directory and attributes $A_q$ that are in the projection list. The query is said to be conjunctive when the combination of atomic filters is a conjunction (&) of atomic and negative atomic filters. A query template generalizing the set Q, denoted by $t_Q$, is a network directory query, such that (a) for all directory instances I of schema S, $q_i(I) \subseteq t_Q(I)$; $1 \leq i \leq n$; and (b) $t_Q$ is conjunctive. Intuitively, query templates can be thought of as network directory queries—possibly with wildcard values—whose answers suffice to answer each of a set of user queries. For example, instead of keeping queries "(tel=360-8777)", "(tel=3608776)", "(tel=3608786)" and "(tel=3608785)" to describe the contents of the cache, it can be advantageous to compute the query template "(tel=36087*)", and maintain all entries that match this template in the client cache. Both the queries with filters "(tel=3608*)" and "(tel=36087*)" are templates for the queries with filters "(tel=3608786)", "(tel=3608776)" and "(tel=3608750)". Similarly, a query with filter "(objectClass=lip)" is a template for the more complex queries "(&(objectClass=lip) (sn=kapitskaia))" and "(& (objectClass=lip) (tel=3608776))".

Accordingly, the semantic description of the cached data can consist of the schema of the directory server and a set of actual query templates ("AT") describing the cached data. The presence of a query template t in AT indicates that every directory entry that is an answer to t is present in the cached directory entries. Further, each cached directory entry is guaranteed to be an answer to at least one of the actual query templates in AT. LDAP applications often ask queries that instantiate one of a set of predefined "signatures". Where user templates are used to represent such signatures, the size of the semantic description is significantly reduced compared to query caching. Such a directory cache would then not only be able to efficiently answer a previously posed user query (such as "(tel=3608777)"), but also a new query (such as "(tel=3608751)") that matches the query template.

It should be noted that templates in the semantic description may overlap, i.e., a cached directory entry may be an answer to multiple query templates. In accordance with another aspect of the invention, it is advantageous to avoid replication of entries by merging the results of different queries—but allow the query templates to overlap. The response entries with the same distinguished name brought in the cache as the result of different queries can be merged, e.g. by taking the union of the (attribute, value) pairs. This avoids storage of redundant data and leads to a higher effective utilization of the cache. Moreover, by avoiding replication of entries, user queries can be answered by simply selecting the data from the cache instead of performing expensive "joins" at the cache. On the other hand, it is advantageous to allow the templates to overlap with each other. Computing disjoint query templates introduces negation in the templates, thereby considerably increasing the complexity of determining cache answerability and the number of such disjoint templates and hence the storage overhead of the meta-data. It is should also be noted that the complexity of cache answerability is high when the query templates project attributes. Thus, it is preferable that the query templates be positive, conjunctive, and projection-free for purposes of rendering cache answerability manageable in practice.

The component architecture of the semantic directory cache roughly comprises two principal architectural modules: a cache manager and the data and meta-data cache. The components of the data and the meta-data are further discussed in the next section, Section A. In Section B, the functionalities of the various components of the cache manager, and their interactions during the various processes that manage the cached data, are described.

A. Creation and Maintenance of Query Templates

Figure 2:
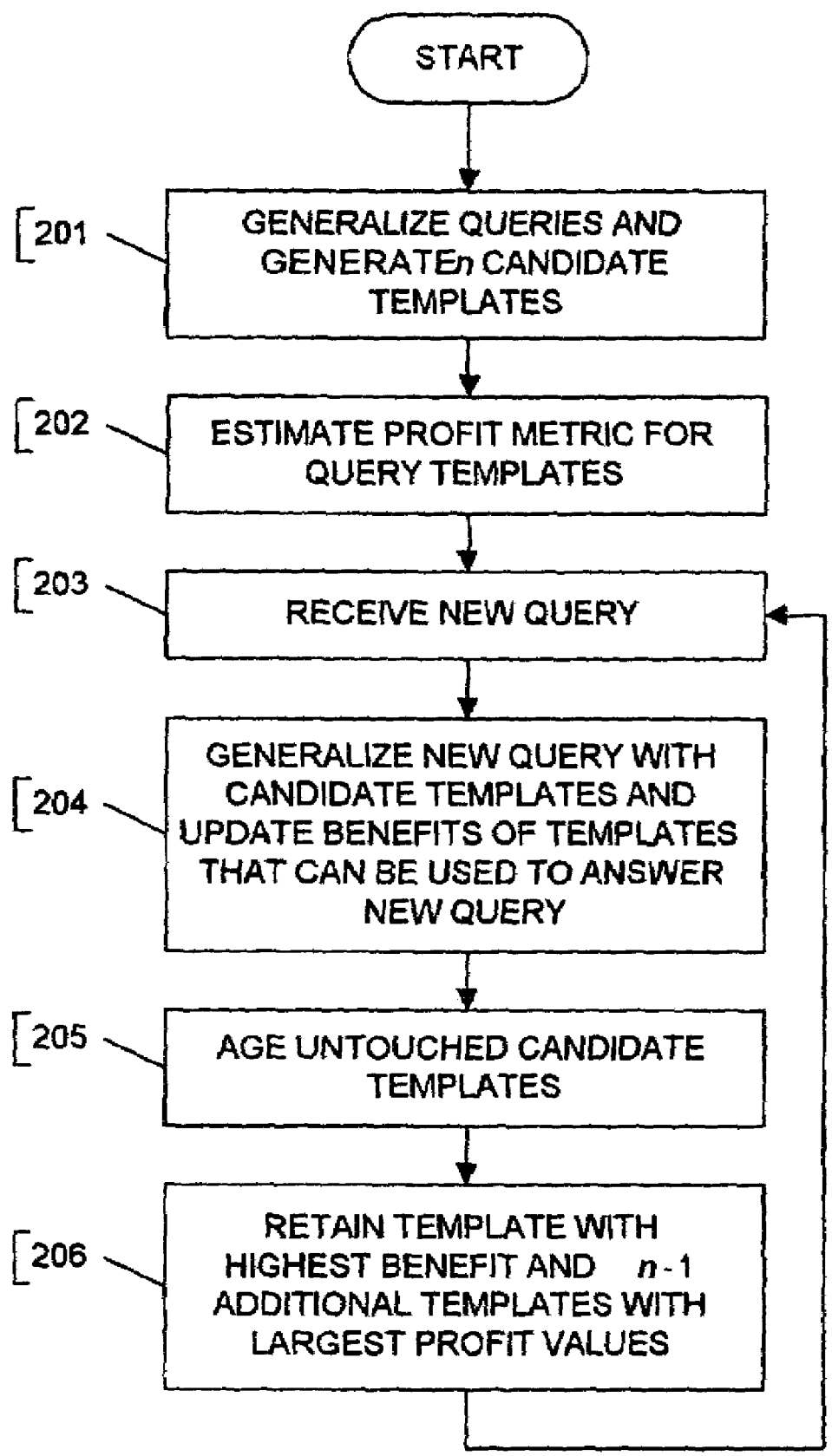
FIG. 2 sets forth a flowchart of processing performed by the client in creating query templates.

The passage staring at col. 2 line 37 FIG. 2 sets forth a flow chart illustrating the processing performed by the client in computing query templates, their costs, and maintaining their benefits, in accordance with a preferred embodiment of an aspect of the invention. Given a set of user LDAP queries, many possible query templates (each generalizing a different subset of the user queries) can be created. Keeping all possible templates can result in an inefficient use of the limited amount of cache space. Hence, at step 201, it is advantageous to generate a fixed number, say n, of query templates, referred to herein as "candidate"templates ("CT").The candidate templates are kept as candidates to be admitted into the cache in the future. The number n of templates to be kept can be determined adaptively. Computation of a useful query template that generalizes a given pair of queries efficiently can take advantage of a combination of techniques. For example, explicitly specified generalization hierarchies on attribute domains can be utilized, e.g., prefix matching on telephone numbers and suffix matching on email addresses, to compute generalizations of atomic filters. The atomic filters "(mail=olga@research.att.com)" and "(mail=divesh@research.att.com)" would generalize to the filter "(mail=*@research.att.com)". The natural hierarchy on conjunctive filters can also be utilized based on the subset relationship between sets of conjuncts. For example, filters "(&(objectClass=lip) (mail=rng@research.att.com))" and "(&(mail=olga@research.att.com) (gender=f))" would generalize to the filter "(mail=*research.att.com)". At step 202, a cost and benefit is associated with each such candidate template. Each candidate and actual query template t can be advantageously annotated with three statistical components: (i) s(t): size of the result of t, (ii) c(t): cost of execution of t, and (iii) b(t): benefit of caching t. The size s(t) can be efficiently estimated, without evaluating t at the directory server, based solely on the statistics maintained about the directory entries at the client. In particular, pruned suffix trees are very useful when estimating the sizes of string wildcard queries that constitute query templates. See co-pending, commonly-assigned U.S. Pat. No. 6,401,088, titled "METHOD AND APPARATUS FOR SUBSTRING SELECTIVITY ESTIMATION," which is incorporated by reference herein. The cost c(t) is a measure of the total evaluation cost of the query template at the directory server, and the communication cost of transmitting the query and the query answer over the network. This can be estimated at the client using knowledge of the network and directory server parameters. One would ideally like to measure the benefit of a template t as the sum of the costs $c(q_i)$ of future user queries $q_i$ that could be answered using the result of t. Since future reference patterns are not available in advance, the probability of a future reference can be approximated from a past reference pattern using the history of user queries. However, maintaining the entire history of user queries is infeasible. Hence, an estimate of the benefit of a template t can be computed using the benefits of available candidate templates that instantiate t. For a template t that is not instantiated by any candidate templates, the benefit b(t) can be estimated by its cost c(t). These three components constitute a "profit" metric that the replacement policies can use to find the most profitable templates to cache. As demonstrated later, a useful profit p(t) of a template t is computed as: p(t)=((b(t)−c(t))/s(t).

Upon receipt of a new user query, at step 203 in FIG. 2, there are two actions that are performed in the client cache that potentially affect the subsequent contents of the cache: (1) the benefits of the actual and candidate query templates are updated to reflect their utility in being able to answer the user query; and (2) new candidate templates may need to be generated and their benefits and costs estimated. Accordingly, an update of the replacement values of pages, objects or semantic regions is made, including the benefits and costs of query templates in the costs of the context of the directory caches. Steps 204 to 206 in FIG. 2 deal with the novel second issue, which arises because of the central role played by query templates in the instant architecture. The user query q and the current set of candidate query templates CT={$ct_1, \ldots, ct_n$} are used to compute pair-wise generalizations of q with each query template in CT, in step 204. When the generalization of template t with query q is t itself, the result of t can be used to answer query q; in this case, the benefit b(t) is updated by the execution cost c(q) of the query. At step 205, untouched query templates in CT are aged by a suitably chosen aging factor. From the resulting set of (up to) 2n+1 templates (including query q itself), all templates whose size exceeds the cache size can be discarded. Then, at step 206, the template with the largest benefit is chosen, and n−1 additional templates with the largest profit p(t) are chosen. FIG. 3 sets forth pseudo-code for this algorithm, referred to as "ChooseCandidates", which incrementally maintains the benefits of the templates in the cache. The algorithm relies on an algorithm "CompPairTemplates" which computes query templates that generalize a pair of queries, the process of which is described in further detailed above.

To efficiently manage the cache, it is advantageous to compute the benefit of a set of templates, e.g. actual templates or the set of candidate templates that can be used to replace the actual templates. This is complicated by the presence of overlap. With overlap, the benefit of a set of query templates can no longer be accurately estimated as the sum of the benefits of the individual templates. In general, the benefit of a set of query templates will be smaller than the sum of the benefits of the individual templates, but no smaller than the largest benefit. For example, the benefit b({$t_a, t_b$}) of two query templates $t_a$ and $t_b$ is computed as b($t_a$)+b($t_b$)−b(&($t_a t_b$)). Computing b(&($t_a t_b$)) requires access to the history of user queries, which is not available. One idea then is to use the small set of CT of candidate query templates and their benefits in the cache to estimate the benefit of the overlap. A conservative estimate of this overlap is computed as the maximum benefit of a query template that instantiates (&($t_a t_b$)). By iteratively applying the above formula to compute b(&($t_a t_b$)) it is possible to obtain the benefit of a set of templates b({$t_{i1}, \ldots, t_{ii}$}).

B. Cache Processes

Figure 4:
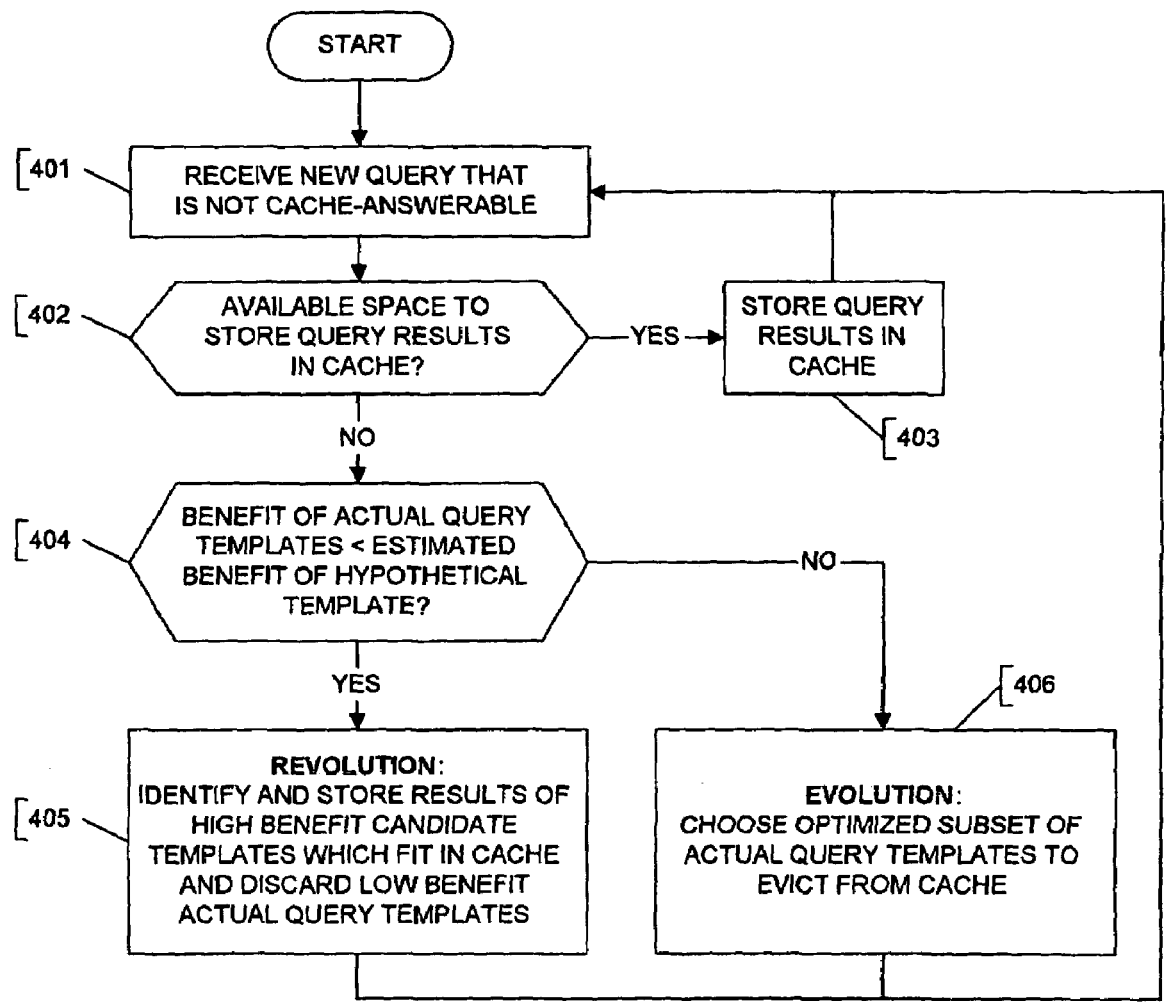
FIG. 4 sets forth a flowchart of processing performed by the client in maintaining the cache and the set of query templates.

The semantic directory cache contains a cache manager, the principal functionality of which is the admission of the data into the cache and the replacement of the data from the cache. FIG. 4 sets forth a flow chart of processing performed by the cache manager, in accordance with a preferred embodiment of an aspect of the invention. At step 401, a new user query is received that is assumed to be not cache-answerable. If there is available space to store the query results in the cache, at step 402, then the query results may be stored at step 403. If, however, the result of this query, fetched from the directory server by the cache manager, does not fit in the cache, the cache manager needs to determine how, if at all, to change the contents of the cache. Standard caching architectures, when faced with this situation, react by identifying low benefit pages, objects or semantic regions in the cache that, when evicted, would free up enough space.

The present cache, however, in contrast, can react in what the inventors refer to as a "revolutionary" fashion. At step 405, the cache processes can react by identifying high benefit candidate templates whose results fit in the cache, and discarding low benefit actual query templates. FIG. 5 sets forth pseudo-code describing more formally the "revolutionary" change. Let AT={$at_1, \ldots, at_k$} be the actual query templates corresponding to the cached directory entries, CT={$ct_1, \ldots, ct_n$} be the candidate query templates, and S be the size of the cache. Among all subsets of the union of the actual and candidate templates AT∪CT, choose a set CT' (for admission to the cache) such that the residual benefit b(CT')−c(CT') is maximized subject to the constraint that s(CT')≦S. To take advantage of the presence of the data in the cache when deciding on the new cache contents, it is necessary to take the overlap between the candidate templates and the actual templates into account and modify the execution costs c($t_i$) of the templates in AT∪CT by replacing c($t_i$) by c(&(!$at_j$)…(!$at_k$)). A consequence of this modification is that each template in AT has its cost as 0. Even in the absence of overlapping templates, this problem is equivalent to what is referred to in the art as the "KNAPSACK" problem, which can be shown to be NP—complete. FIG. 5 sets forth a "greedy" heuristic that takes overlap into account and delivers a competitive solution that is based on selecting elements in decreasing order of b/s. This is, in fact, the main reason why the profit metric set forth above is computed as (b(t)−c(t))/s(t). The c(t) component is based on observations that the benefit of a candidate template needs to be offset by its execution cost and that a candidate template may be selected to bne an actual template even when there is no overlap between the candidate template and the currently cached data.

When revolutions are initiated on each user query, the overhead of maintaining the cache can become prohibitive. To reduce the cost of cache management, it is advantageous to combine the "revolutionary" approach with an "evolutionary" approach that modifies cache contents incrementally. The goal of the evolutionary approach, as set forth in step 406 in FIG. 4, is to choose an optimized subset of the actual query templates to evict from the cache. This can described more formally in the context of the above architecture as follows. Let AT={$at_1, \ldots, at_k$} be the set of actual query templates corresponding to the cached directory entries, and S be the size of the cache. Let q be the user query that is not cache—answerable, and suppose that the cache does not have enough available space, i.e., s(AT∪{q})>S. Among all subsets of AT, choose a set AT' to be evicted from the cache, such that the benefit b(AT') is minimized subject to the constraints that: (a) the total benefit b(AT') of the evicted query templates should be lower than the benefit b(q) of the newly inserted query, and (b) the result, AT\AT'∪{q}, after eviction of AT' and insertion of q should still fit in the cache. Obtaining an exact solution for this optimization problem is computationally hard. Nevertheless, a greedy, computationally efficient approximation to the problem can be utilized, based on selecting elements in increasing order of the profit metric p(t). Since the results of the selected templates are already in the cache, the c(t) component of p(t) can be set to 0.

Provided that the actual query templates have a "high enough" benefit, evolutionary changes to the cache are quite useful: the total estimated benefit of the cache is increased without incurring a significant computational overhead.

However, when the actual query templates do not have a high enough benefit, it is more beneficial to change the contents of the cache in a revolutionary way. The candidate query templates that were generated, and whose benefits maintained, during evolutionary periods in the history of the cache, provide the source for an effective revolution. Such a revolution would hopefully be followed by a long period of stable cache contents, or evolutionary changes in the cache.

FIG. 4 sets forth a hybrid approach that employs both revolutionary and evolutionary changes. An important question is when do revolutions get initiated. Intuitively, revolutions should be initiated when the benefit of the actual query templates becomes "too small". Instead of picking a constant threshold, it is advantageous to utilize an adaptive threshold, as reflected in step 404. When the candidate templates are maintained, as described above and in FIG. 3, a subset of the candidate templates is chosen to constitute a hypothetical cache: (a) the size of the hypothetical cache is the same as that of the actual cache; and (b) the query templates HT that constitute the semantic description of the hypothetical cache are a subset of the candidate templates, selected without considering overlap (to enable efficient maintenance of HT). No data need be fetched. A revolution is initiated when the benefit of the actual query templates falls below the estimated benefit of the hypothetical templates: e.g. b(AT) is less than K·b(HT), for some normalization constant K. The value of K is dependent on the query workload and the degree of overlap between computed templates.

The clientside computational overhead of template caching, in accordance with the present invention, is dominated by two components: (i) the cost of performing revolutions, and (ii) the cost of computing generalized templates. Both these costs can be tuned by adjusting the frequencies with which these tasks are performed. The frequency of performing revolutions is influenced by the value of the parameter K. Experiments conducted by the inventors suggest that even performing revolutions infrequently still enhances the overall effectiveness of the cache. When K is very close to 0, e.g. smaller than $10^{-15}$, the hybrid approach behaves like query caching, resulting in low hit rate and low overhead. The interval of K between $10^{-15}$ and 1.37 appears to be the most interesting, with a hit rate comparable to non-hybrid template caching but with a significantly smaller cost. With K>1.37, hybrid caching behaves like template caching. As for the frequency of generalizations, it appears that, in the case of a stable workload pattern, performing generalizations infrequently does not significantly affect the relative hit rate—yet, the computational overhead drops significantly. However, when the pattern of user queries changes over time, generalizations have to be performed frequently for revolutions to be useful. When generalizations are performed often (up to once every 25 queries), the behavior of the cache manager is similar to that in the case of a stable workload. When generalizations are performed less often, the relative costs appear to increase again, without any improvement in the relative hit rate. The reason appears to be that, although (expensive) revolutions are being performed, beneficial generalized templates are created and admitted into the cache too late to have any utility.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

What is claimed is:

1. A method of managing a cache, the method comprising the steps of:
   determining whether a received user query is answerable by said cache;
   querying a data source other than said cache when determining said user query is not answerable by said cache;
   storing results of said query in said cache, when space is available in said cache;
   determining whether benefit of maintaining existing query templates for said cache versus benefit of introducing a new set of query templates that includes a generalization of said user query,
   when the result of the query fetched from a directory server by a cache manager does not fit in said cache; and
   identifying and storing said introduced new set of query templates to be associated with said cache if said benefit of maintaining existing query templates for said cache is smaller than the sum of the benefits of said introduced new set of templates that includes a generalization of said user query.

2. A method of managing a cache in response to generalized queries obtained by generalized individual user query is not answerable by said cache, said cache includes a first set of actual templates that corresponds to query result retrieved from said data source in response to a query, and a second set of candidate templates, said method comprising the steps of:
   determining whether a received user query is answerable by said cache;
   querying a data source other than said cache when determining said user query is not answerable by said cache;
   storing results of said query in said cache, when space is available in said cache;
   updating each of said candidate templates based on said user query, to form an updated set of candidate templates; and
   when said cache has insufficient space to store said responsive query results:
      selecting a subset of said updated candidate templates as a set of hypothetical templates, wherein the hypothetical set is a set of templates that, when applied to said data source, would result in an amount of responsive information that can be stored in said cache;
      determining whether a collective of said hypothetical set of templates is greater than a collective of said set of actual templates;
      replacing said actual templates with said hypothetical set of templates to form a new set of actual templates and, correspondingly, updating said cache to contain information of data store that corresponds to said new set of actual templates, when said step of determining concludes in the affirmative; and
      removing a subset actual templates from said set of actual templates, and removing information from said cache that is not associated with any of the templates that remain in said set of actual templates, where the actual templates in said subset are such that the removed information enables storing said responsive information in said cache, and storing said responsive information in said cache, when said step of determining concludes in the negative.

* * * * *